United States Patent
Slemons et al.

(10) Patent No.: US 10,221,600 B2
(45) Date of Patent: Mar. 5, 2019

(54) VEHICLE BODY SYSTEM

(71) Applicant: Ford Global Technologies, LLC, Dearborn, MI (US)

(72) Inventors: James Slemons, Waterford, MI (US); David James Spolyar, Lake Orion, MI (US); Jeffrey Scott Mayville, Ypsilanti, MI (US); Patrick Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 15/443,539

(22) Filed: Feb. 27, 2017

(65) Prior Publication Data

US 2018/0245388 A1 Aug. 30, 2018

(51) Int. Cl.
*E05D 11/00* (2006.01)
*B60J 5/10* (2006.01)

(52) U.S. Cl.
CPC ........... *E05D 11/0054* (2013.01); *B60J 5/107* (2013.01); *E05Y 2201/11* (2013.01); *E05Y 2900/532* (2013.01)

(58) Field of Classification Search
CPC .................. E05D 11/0054; B60J 5/107; E05Y 2900/532; E05Y 2201/11

USPC ................... 296/146.11, 108, 146.8, 76, 210
See application file for complete search history.

(56) References Cited

U.S. PATENT DOCUMENTS

| 5,195,793 | A | 3/1993 | Maki | |
|---|---|---|---|---|
| 6,813,865 | B2 | 11/2004 | Peterson | |
| 8,615,962 | B1 | 12/2013 | Perez et al. | |
| 2005/0046229 | A1* | 3/2005 | Yamada | B60J 5/101 296/146.8 |
| 2013/0234474 | A1* | 9/2013 | Coakley | B60R 13/04 296/210 |

* cited by examiner

*Primary Examiner* — Joseph D. Pape
*Assistant Examiner* — Dana D Ivey
(74) *Attorney, Agent, or Firm* — Jason Rogers; Brooks Kushman P.C.

(57) ABSTRACT

A vehicle includes a roof panel, hinge bracket, cover, and retaining clip. The roof panel defines a recess. The hinge bracket is secured to the roof panel within the recess. The cover is disposed in the recess. The cover has a doghouse that extends downward toward the bracket. The retaining clip has a head that is disposed within the doghouse, a stem that extends downward from the head beyond the doghouse, and a biasing element that forces an opposing surface of the stem into contact with an edge of the bracket.

20 Claims, 4 Drawing Sheets

VEHICLE BODY SYSTEM

TECHNICAL FIELD

The present disclosure relates to vehicles and more particularly to vehicle body structures.

BACKGROUND

Vehicle body structures may act as mounting platforms and provide structural support for additional vehicle components and subsystems.

SUMMARY

A vehicle includes a roof panel, hinge bracket, cover, and retaining clip. The roof panel defines a recess. The hinge bracket is secured to the roof panel within the recess. The cover is disposed in the recess. The cover has a doghouse that extends downward toward the bracket. The retaining clip has a head that is disposed within the doghouse, a stem that extends downward from the head beyond the doghouse, and a biasing element that forces an opposing surface of the stem into contact with an edge of the bracket.

A vehicle hinge cover system includes a cover and a retaining clip. The cover has a doghouse that extends downward. The retaining clip has a head disposed within the doghouse, a stem that extends downward from the head beyond the doghouse, and a biasing element that extends outward from the retaining clip. The biasing element is configured to force an opposing surface of the stem into contact with an edge of the bracket upon installation.

A vehicle includes a body panel, bracket, cover, and retaining clip. The body panel defines a recess. The bracket is secured to the panel within the recess. The cover is disposed in the recess. The cover has a doghouse that extends downward toward the bracket. The retaining clip has a head disposed within the doghouse, a stem that extends downward from the head beyond the doghouse, and a biasing element that forces an opposing surface of the stem into contact with an edge of the bracket.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
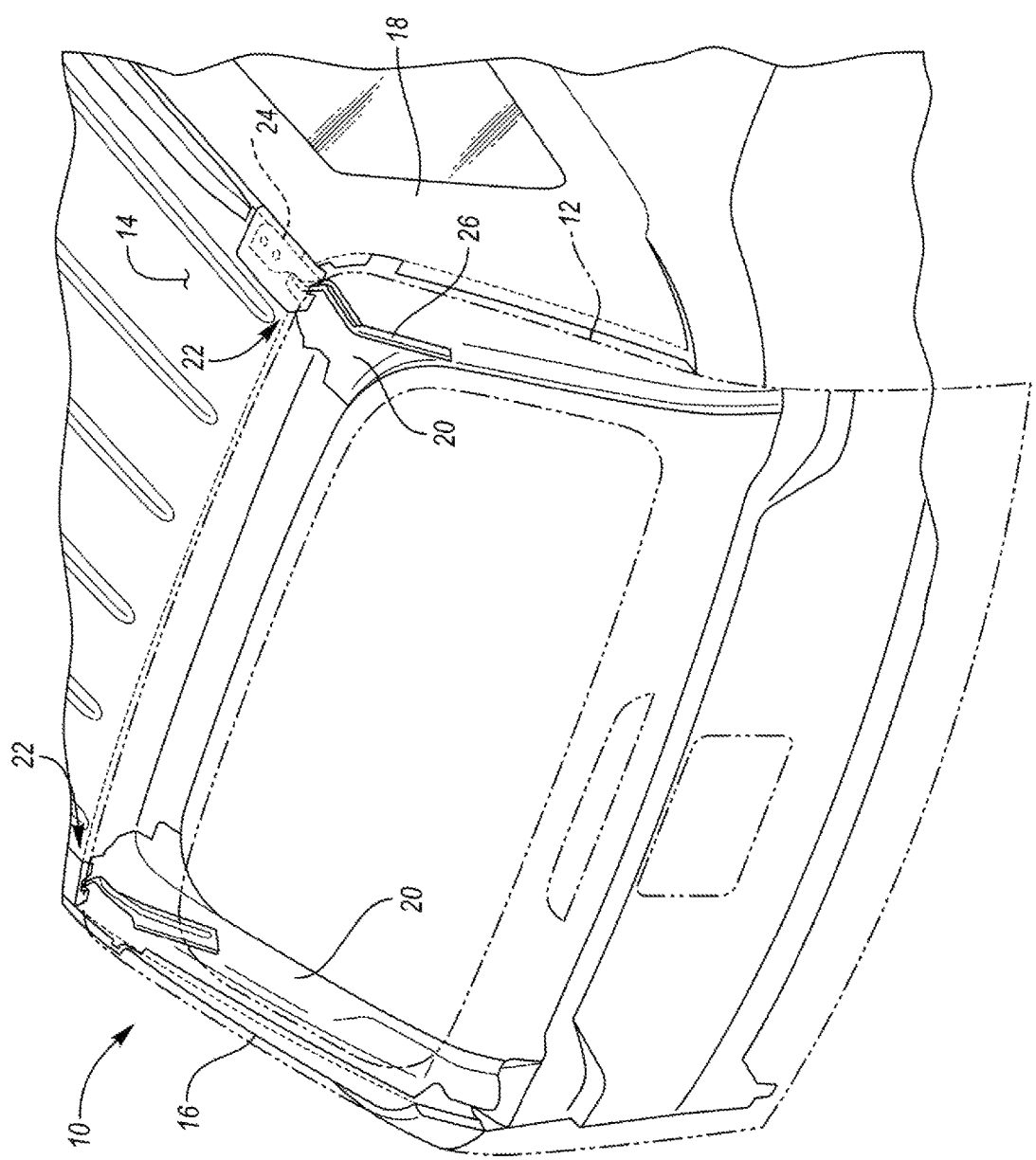
FIG. 1 is a rear perspective view of a vehicle having a rear door that swings upward to provide access to a storage or trunk space.

Referring to FIG. 1, a rear perspective view of a vehicle 10 having a rear door 12 that swings upward to provide access to a storage or trunk space is illustrated. The rear door 12 is illustrated in phantom so that other components of the vehicle 10 may be clearly illustrated. More specifically, FIG. 1 illustrates several components of the vehicle body structure. The vehicle 10 includes a roof panel 14. The roof panel 14 is secured to a first rear side panel 16 and a second rear side panel 18. The first rear side panel 16 may also be referred to as the driver side rear body side. The second rear side panel 18 may also be referred to as the passenger side rear body side. The roof panel 14, first rear side panel 16, and second rear side panel 18 may all also be secured to a doorframe 20, which may also be referred to as the trough, that is configured to receive the rear door 12 when in a down and closed position. The roof panel 14, first rear panel 16, second rear panel 18, and the doorframe 20 are all body panels (e.g., panel component that comprise the vehicle body structure) and may be secured to each other by a welding process or by fasteners such as rivets, screws, bolts, or any other type of faster known to a person of ordinary skill in the art.

The vehicle 10 may also include a hinge system is configured to rotatably secure the rear door 12 to the vehicle 10. More specifically, the hinge system may comprise a pair of hinges 22 that are secured to the roof panel 14 proximate to opposing sides of the doorframe 20. Additionally, one of the pair of hinges 22 may be secured to the roof panel 14 proximate to the first rear side panel 16 while the other of the pair of hinges 22 is secured to the roof panel 14 proximate to the second rear side panel 18. Each of the pair of hinges 22 may include a first hinge bracket 24, which may also be referred to as the hinge roof bracket, that is secured to the roof panel 14 and a second hinge bracket 26, which may also be referred to as the hinge liftgate bracket, that is secured to the rear door 12. The first hinge bracket 24 and the second hinge bracket 26 of each of the hinges 22 may be rotatably secured to each other. The first hinge brackets 24 may be secured to the roof panel 14 and the second hinge brackets 26 may be secured to the rear door 12 by fasteners such as rivets, screws, bolts, or any other type of faster known to a person of ordinary skill in the art. More specifically, the first hinge brackets 24 may be secured to the roof panel 14 at positions where the roof panel overlaps the first rear body side panel 16 and the second rear body side panel 18 in order increase the structural support.

Figure 2:
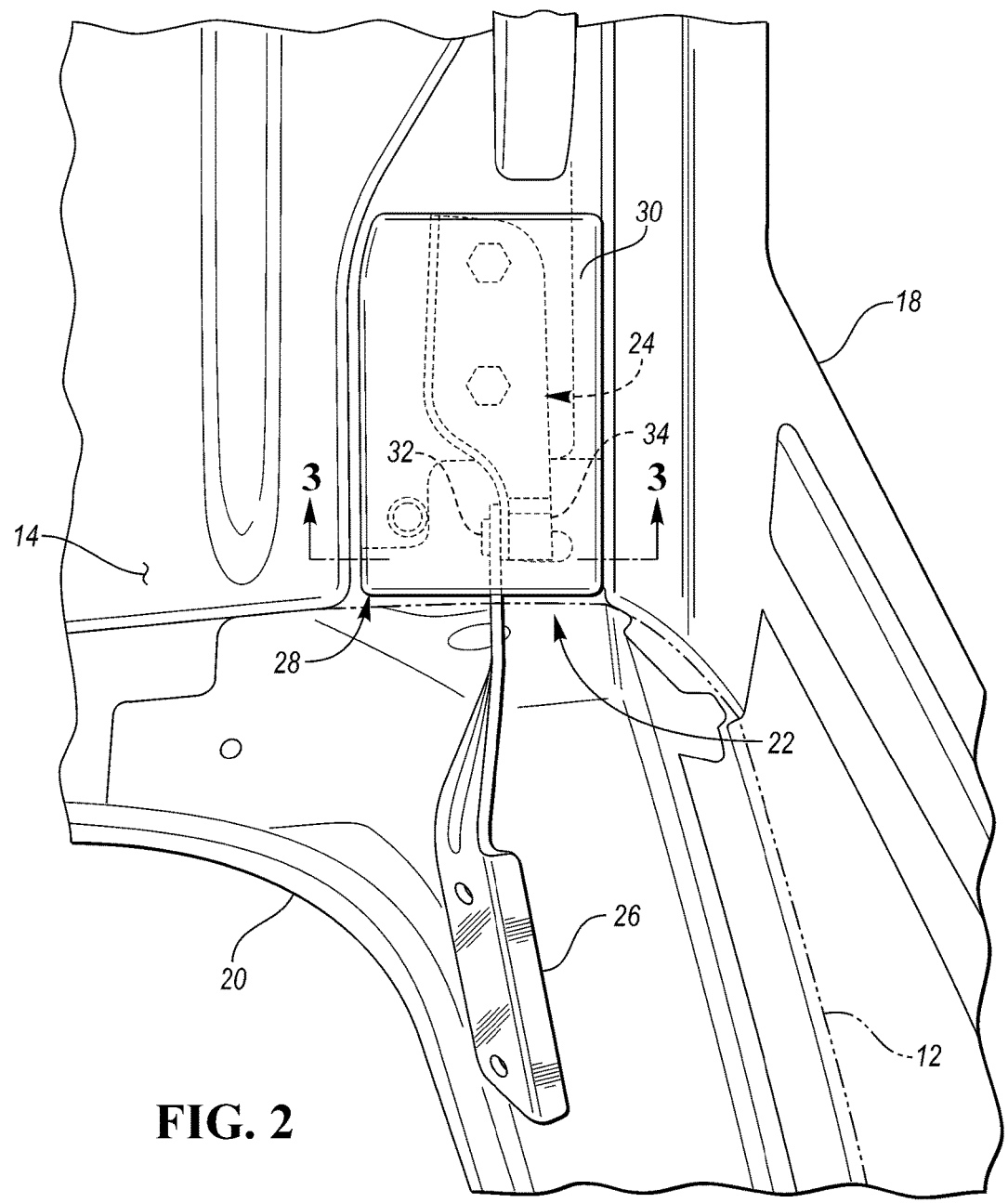
FIG. 2 is a top magnified view of the vehicle proximate to a hinge system that rotatably secures the rear door to the vehicle.

Referring to FIG. 2, a top magnified view of the vehicle 10 proximate to the hinge system that rotatably secures the rear door 12 the vehicle 10 is illustrated. More specifically, FIG. 2 is a top magnified view of one of the hinges 22 that comprises the hinge system. It should be understood, that the second hinge 22 that is not depicted in FIG. 2 may include all the components of the hinge 22 depicted in FIG. 2. It should be further understood, that the second hinge 22 that is not depicted in FIG. 2 may be a mirror image of the hinge 22 depicted in FIG. 2. The roof panel 14 may define a recess 28. The first hinge bracket 24 may be disposed within the recess 28 such that the first hinge bracket 24 is secured to the roof panel 14 within the recess 28. A cover 30 may be disposed within the recess 28 over the first hinge bracket 24. The cover 30 may also be disposed over a portion of the second hinge bracket 26. The cover 30 may be further disposed over a pin 32 that rotatably secures the second hinge bracket 26 to the first hinge bracket 24. The first hinge bracket 24 may include an overhanging portion 34 that extends beyond and overhangs the roof panel 14. The second hinge bracket 26 may be rotatably secured to the first hinge bracket 24 by the pin 32 at the overhanging portion 34 of the first bracket 24.

Figure 3:
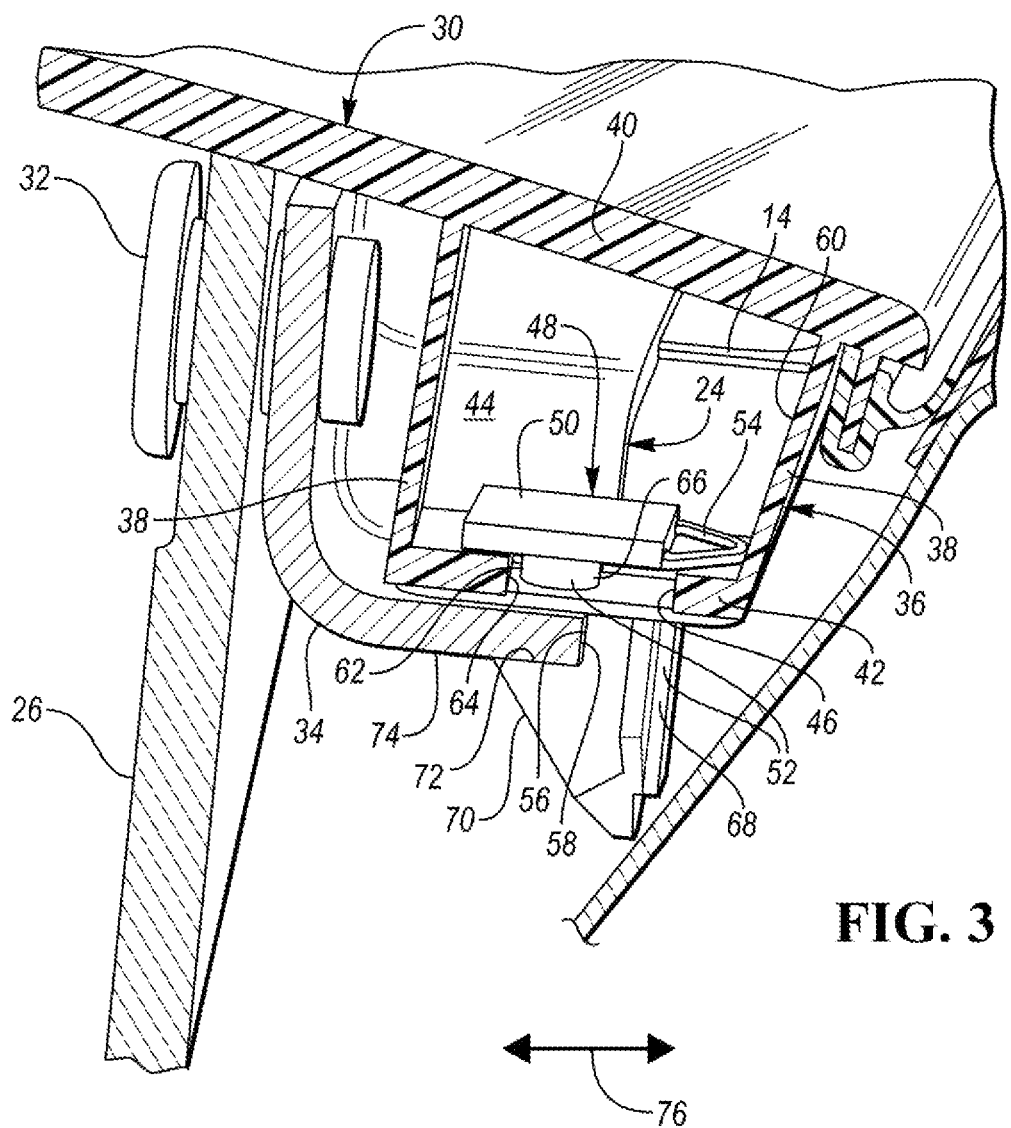
FIG. 3 is a cross-sectional view of the hinge system taken along line 3-3 in FIG. 2.

Referring to FIG. 3, a cross-sectional view of the hinge system taken along line 3-3 in FIG. 2 is illustrated. The cover 30 includes a doghouse 36 that extends downward from the cover 30 towards the first hinge bracket 24. The doghouse 36 includes two sidewalls 38 that extend downward from the top wall 40 to a bottom wall 42 of the cover 30. The bottom wall 42 of the cover 30 may also be referred to as the bottom wall 42 of the doghouse 36. An open space (or cavity) 44 is defined between the top wall 40, bottom wall 42, and two sidewalls 38. The bottom wall 42 may define an orifice 46 that provides access to the open space 44.

A retaining clip 48 secures the cover 30 to the first hinge bracket 24. The retaining clip 48 includes a head 50 is disposed within the open space 44 of the doghouse 36. The retaining clip 48 may also include a stem 52 that extends downward from the head 50 and beyond the doghouse 36. More specifically, the stem 52 may extend from the head 50 within the open space 44 and through the orifice 46 beyond the doghouse 36.

A biasing element 54 extending from the retaining clip 48 and may force a first opposing surface 56 of the stem 52 into contact with an edge 58 of the first hinge bracket 24. More specifically, the biasing element 54 may force the first opposing surface 56 of the stem 52 into contact with the edge 58 of the first hinge bracket 24 along the overhanging portion 34 of the first bracket 24. The biasing element 54 may extend outward from the head 50. The biasing element 54 may engage and apply a force to an internal lateral surface 60 of the doghouse 36 to force the first opposing surface 56 of the stem 52 into contact with the edge 58 of the first hinge bracket 24. The internal lateral surface 60 of the doghouse 36 may be an inner surface of one of the two sidewalls 38. The biasing element 54 may also force a second opposing surface 62 of the stem 52 into contact with an internal peripheral surface 64 of the doghouse 36 that defines the orifice 46. The stem 52 may include a first portion 66 and a second portion 68 that are offset relative to each other. The first portion 66 may include the second opposing surface 62 and may extend from the head 50 and into the orifice 46. The second portion 68 may include the first opposing surface 56 and may extend from the first portion 66 to beyond the doghouse 36. The biasing element 54 may be an integral portion of the retaining clip 48. For example, the biasing element 54 may be a living hinge that extends from the retaining clip 48. Alternatively, the biasing element 54 may be a metallic spring that is over molded into the retaining clip 48.

The retaining clip 48 may include a tapered end 70 that is located on an opposing side of the retaining clip 48 relative to the head 50. The tapered end 70 may taper outward and extend upward towards the first opposing surface 56 and/or second opposing surface 62 of the stem 52. The tapered end 70 may terminate along a ledge 72 that extends horizontally from the tapered surface of the tapered end 70 to the first opposing surface 56 of the stem 52. The tapered end 70 may be disposed below the first hinge bracket 24 such that the ledge 72 is below and facing a lower surface 74 of the overhanging portion 34 of the first bracket 24. During installation, the tapered end 70 acts to deflect the stem 52 relative to the first hinge bracket 24. Once the tapered end of 70 extends beyond the first hinge bracket, the stem 52 returns to an un-deflected position such that the ledge 72 is below the lower surface 74. This secures the retaining clip 48 and the cover 30 into their desired positions and prevents the retaining clip 48 and the cover 30 from slipping out of their desired positions. The biasing element 54 ensures engagement of the retaining clip with the edge 58 of the first hinge bracket 24 while maintaining the position of the cover 30 in the event that the position of the first hinge bracket 24 is adjusted in a lateral direction which is represented by the double arrow 76.

Figure 4:
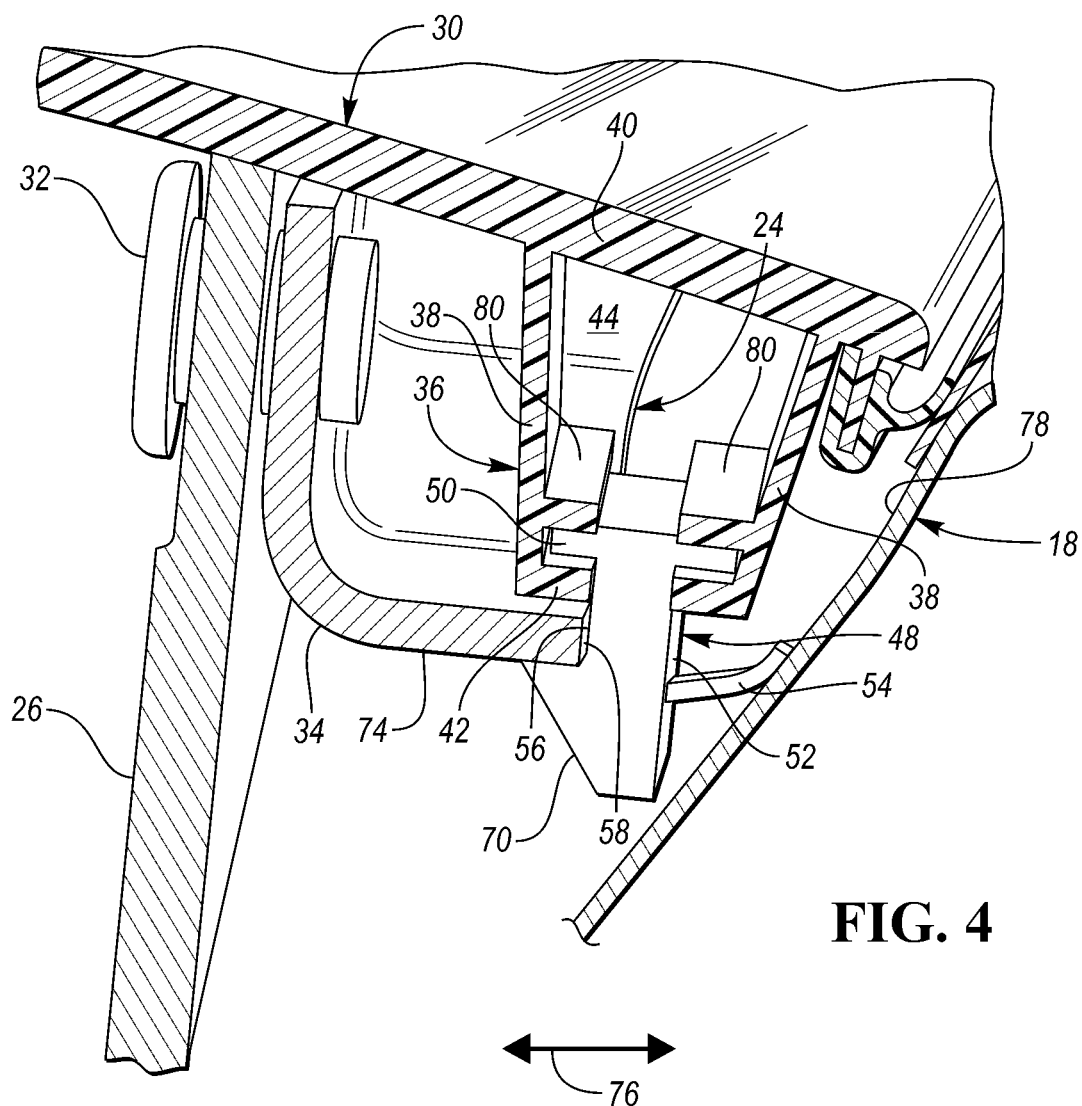
FIG. 4 is a cross-sectional view of an alternative embodiment of the hinge system.

Referring to FIG. 4, a cross-sectional view of an alternative embodiment of the hinge system is illustrated. The alternative embodiment of the hinge system should be construed to include all of the elements of the embodiment of the hinge system depicted in FIG. 3, unless otherwise described herein. In the alternative embodiment, the stem 52 of the retaining clip 48 is a singular piece that extends from the head 50 to the tapered end 70 of the retaining clip 48 (i.e., the stem 52 does not include two portions that are offset from each other). Additionally, the biasing element 54 may extend outward from the stem 52 such that the biasing element 54 engages and applies a force to an internal surface 78 of the second rear side panel 18 (or alternatively the doorframe 20) in order to force the first opposing surface 56 of the stem 52 into contact with the edge 58 of the first hinge bracket 24. The doghouse 36 may also include a pair of internal laterally extending walls 80 that are disposed between the top wall 40 and the bottom wall 42 of the cover 30. The laterally extending walls 80 may be positioned such that the head 50 is disposed between the laterally extending walls 80 and the bottom wall 42 of the cover 30. More specifically, the laterally extending walls 80 and the bottom wall 42 may be sized and positioned to prevent relative up and down movement of the retaining clip 48.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a roof panel defining a recess;
   a hinge bracket secured to the roof panel within the recess;
   a cover disposed in the recess and having a doghouse extending downward toward the bracket; and
   a retaining clip having a head disposed within the doghouse, a stem extending downward from the head beyond the doghouse, and a biasing element forcing an opposing surface of the stem into contact with an edge of the bracket.

2. The vehicle of claim 1, wherein the biasing element extends outward from the head, and the biasing element engages and applies a force to an internal lateral surface of the doghouse forcing the opposing surface of the stem into contact with the edge of the bracket.

3. The vehicle of claim 2, wherein the biasing element forces a second opposing surface of the stem into contact with an internal peripheral surface of the doghouse that defines an orifice that accesses the doghouse.

4. The vehicle of claim 1, wherein the recess is proximate to a side panel, the biasing element extends outward from the stem, and the biasing element engages and applies a force to the side panel forcing the opposing surface of the stem into contact with the edge of the bracket.

5. The vehicle of claim 1, wherein a portion of the hinge bracket overhangs the roof panel and the stem is forced into contact with an edge of the bracket via the biasing element along the overhanging portion of the hinge bracket.

6. The vehicle of claim 1, wherein the retaining clip has a tapered end that tapers outward and extends upward towards the opposing surface of the stem.

7. The vehicle of claim 6, wherein the tapered end terminates along a ledge that extends horizontally from the tapered end to the opposing surface of the stem.

8. The vehicle of claim 7, wherein the tapered end is disposed below the hinge bracket such that the ledge is below and facing a lower surface of a portion of the hinge bracket that overhangs the roof panel.

9. The vehicle of claim 1, wherein the biasing element is a living hinge that is integral with the retaining clip.

10. The vehicle of claim 1, wherein the biasing element is a metallic spring that is over molded into the retaining clip.

11. A vehicle hinge cover system comprising:
a cover having a doghouse extending downward;
a hinge bracket; and
a retaining clip having a head disposed within the doghouse, a stem extending downward from the head beyond the doghouse, and a biasing element extending outward and configured to force an opposing surface of the stem into contact with an edge of the hinge bracket upon installation.

12. The system of claim 11, wherein the retaining clip has a tapered end that tapers outward and extends upward towards the opposing surface of the stem.

13. The system of claim 12, wherein the tapered end terminates along a ledge that extends horizontally from the tapered end to the opposing surface of the stem.

14. The system of claim 11, wherein the stem includes first and second portions that are offset relative to each other, the first portion extending from the head and into an orifice that is defined by and provides access to the doghouse, and the second portion extending from the first portion beyond the doghouse.

15. The system of claim 11, wherein the biasing element is a living hinge that is integral with the retaining clip.

16. The system of claim 11, wherein the biasing element is a metallic spring that is over molded into the retaining clip.

17. A vehicle comprising:
a body panel defining a recess;
a bracket secured to the panel within the recess;
a cover disposed in the recess and having a doghouse extending downward toward the bracket; and
a retaining clip having a head disposed within the doghouse, a stem extending downward from the head beyond the doghouse, and a biasing element forcing an opposing surface of the stem into contact with an edge of the bracket.

18. The vehicle of claim 17, wherein the biasing element extends outward from the head, and the biasing element engages and applies a force to an internal lateral surface of the doghouse forcing the opposing surface of the stem into contact with the edge of the bracket.

19. The vehicle of claim 18, wherein the biasing element forces a second opposing surface of the stem into contact with an internal peripheral surface of the doghouse that defines an orifice that accesses the doghouse.

20. The vehicle of claim 17, wherein the recess is proximate to a second body panel, the biasing element extends outward from the stem, and the biasing element engages and applies a force to the second panel forcing the opposing surface of the stem into contact with the edge of the bracket.

* * * * *